(12) United States Patent
Ogren et al.

(10) Patent No.: US 11,865,892 B2
(45) Date of Patent: Jan. 9, 2024

(54) VEHICLE STRUT ASSEMBLY

(71) Applicants: Nissan North America, Inc., Franklin, TN (US); NISSAN MOTOR CO., LTD., Yokohama (JP)

(72) Inventors: Michael Ogren, Spring Hill, FL (US); Yu Zhang, Farmington Hills, MI (US); Kenichi Komatsu, Atsugi (JP)

(73) Assignees: Nissan North America, Inc., Franklin, TN (US); Nissan Motor Co., Ltd., Yokohama (JP)

( * ) Notice: Subject to any disclaimer, the term of this patent is extended or adjusted under 35 U.S.C. 154(b) by 207 days.

(21) Appl. No.: 17/210,285

(22) Filed: Mar. 23, 2021

(65) Prior Publication Data

US 2022/0305859 A1  Sep. 29, 2022

(51) Int. Cl.
*B60G 7/02* (2006.01)
*B60R 17/00* (2006.01)

(52) U.S. Cl.
CPC ............... *B60G 7/02* (2013.01); *B60R 17/00* (2013.01); *B60G 2204/143* (2013.01); *B60G 2204/418* (2013.01); *B60G 2600/44* (2013.01)

(58) Field of Classification Search
CPC .............. B60G 7/02; B60G 2204/143; B60G 2204/418; B60G 2600/44; B60R 17/00
See application file for complete search history.

(56) References Cited

U.S. PATENT DOCUMENTS

| | | | | |
|---|---|---|---|---|
| 4,274,655 A * | 6/1981 | Lederman | ............ | B60G 15/068 267/221 |
| 4,541,744 A * | 9/1985 | Lederman | ............ | F16C 33/7893 384/615 |
| 4,805,886 A * | 2/1989 | Hassan | ............ | F16F 9/58 267/293 |
| 5,263,694 A * | 11/1993 | Smith | ............ | F16F 1/32 267/33 |
| 9,623,714 B2 * | 4/2017 | Sakairi | ............ | F16C 17/04 |
| 2002/0135111 A1 * | 9/2002 | Bishop | ............ | B60G 15/068 267/64.11 |
| 2020/0164708 A1 * | 5/2020 | Lim | ............ | B60G 15/068 |

FOREIGN PATENT DOCUMENTS

WO    WO-0250450 A1 *  6/2002  ............ B60G 7/001

OTHER PUBLICATIONS

WO-0250450-A1 Machine English Translation (Year: 2001).*

* cited by examiner

*Primary Examiner* — James A English
*Assistant Examiner* — Matthew James O'Neill
(74) *Attorney, Agent, or Firm* — Global IP Counselors, LLP

(57) ABSTRACT

A vehicle strut assembly includes at least a strut member, a bearing assembly, a mounting bracket and a noise isolating member. The bearing assembly encircles an upper end portion of the strut member. The mounting bracket is configured to receive the bearing assembly with mounting bracket encircling the upper end portion of the strut member and further configured to attach to a portion of a vehicle body assembly of a vehicle. The noise isolating member is installed below the mounting bracket and along a surface of the bearing assembly reducing noises transmitted from the vehicle strut assembly to the portion of the vehicle body assembly.

20 Claims, 12 Drawing Sheets

VEHICLE STRUT ASSEMBLY

BACKGROUND

Field of the Invention

The present invention generally relates to a vehicle strut assembly. More specifically, the present invention relates to a vehicle strut assembly with a noise isolating member located in an upper portion of the vehicle strut assembly between adjacent parts of the vehicle strut assembly in order to reduce and/or eliminate suspension related noised generated by the vehicle strut assembly during operation of a vehicle.

Background Information

Vehicle front suspension assemblies often generate noises that result from movement between contacting members of the front suspension assembly resulting in those noises propagating to other portions of the front suspension assembles and to the vehicle's body structure. Various rubber-like or elastic polymer members have been introduced into strut assemblies of front suspension assemblies in order to reduce such noises.

SUMMARY

One object of the present disclosure is to provide a strut assembly with a noise isolating member that reduces or eliminates certain undesirable noises generated by the strut assembly during operation of a vehicle equipped with the strut assembly.

It has been discovered that inclusion of a noise isolating layer of material in an upper area of a vehicle strut assembly effectively between contacting elements thereof reduces and/or eliminates propagation of certain undesirable noises generated by the vehicle strut assembly during operation of a vehicle.

In view of the state of the known technology, one aspect of the present disclosure is to provide a vehicle strut assembly with a strut member, a bearing assembly, a mounting bracket and a noise isolating member. The bearing assembly encircles an upper end portion of the strut member. The mounting bracket is configured to receive the bearing assembly with mounting bracket encircling the upper end portion of the strut member and further configured to attach to a portion of a vehicle body assembly of a vehicle. The noise isolating member is installed below the mounting bracket and along a surface of the bearing assembly reducing noises transmitted from the vehicle strut assembly to the portion of the vehicle body assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
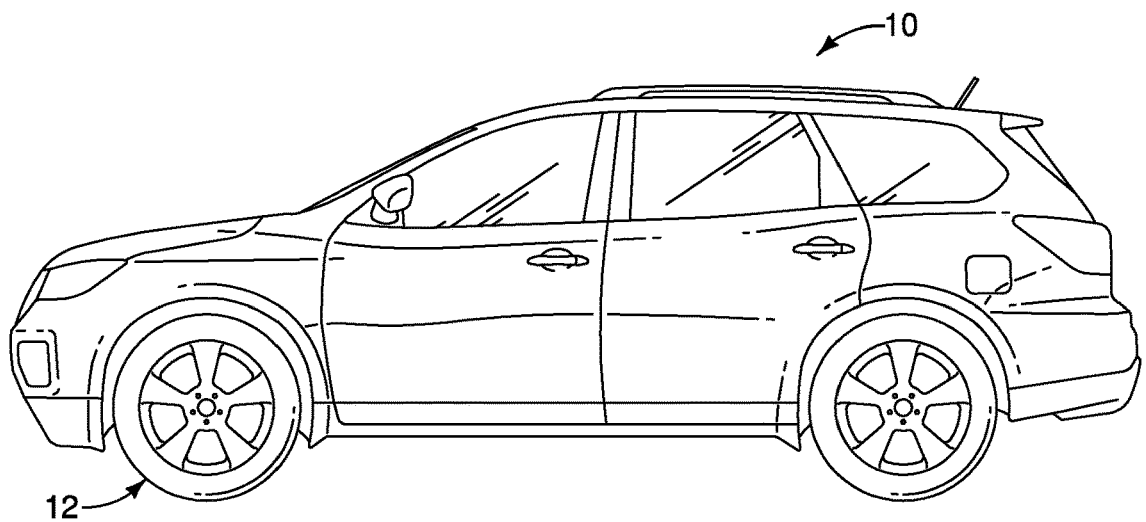
FIG. 1 is a side view of a vehicle having a front suspension assembly that includes a vehicle strut assembly in accordance with a first embodiment.
Figure 2:
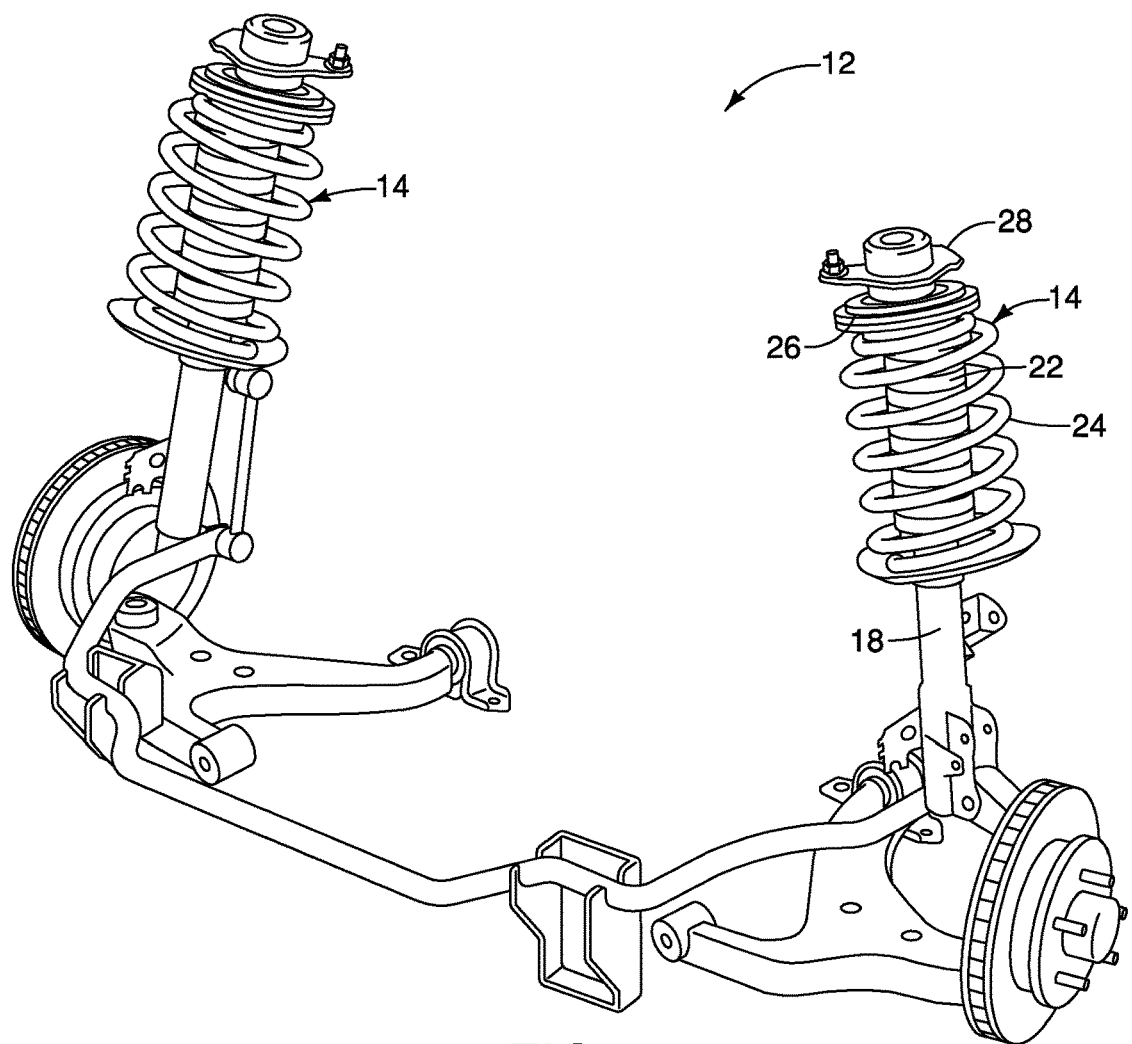
FIG. 2 is a perspective view of the front suspension assembly removed from the vehicle depicted in FIG. 1, showing a pair of vehicle strut assemblies in accordance with the first embodiment.

Referring initially to FIGS. 1 and 2, a vehicle 10 with a front suspension assembly 12 that includes left and right side vehicle strut assemblies 14 is illustrated in accordance with a first embodiment.

As shown in FIG. 2, the vehicle strut assemblies 14 are basically identical, except that they are symmetrical mirror images of one another. Therefore, only one vehicle strut assembly 14 is described hereinbelow for the sake of brevity. However, it should be understood from the description herein and the drawings that description of one of the vehicle strut assemblies 14 applies equally to both.

Figure 3:
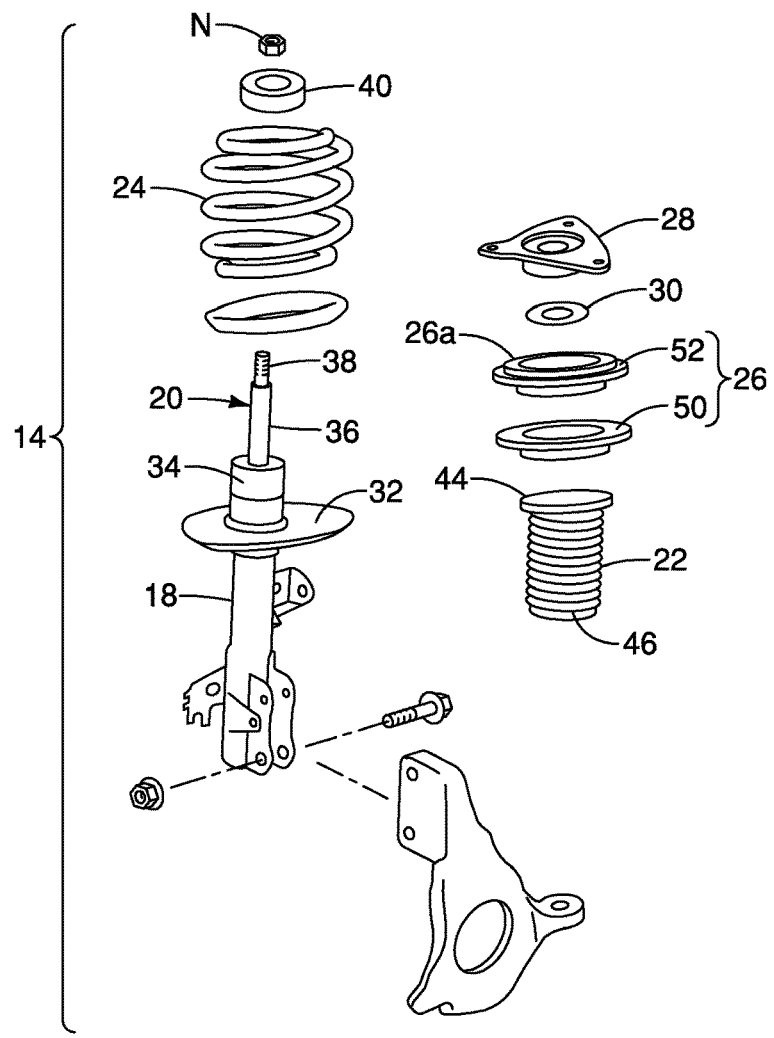
FIG. 3 is an exploded perspective view of various elements of one vehicle strut assembly in accordance with the first embodiment.

As shown in FIG. 3, the vehicle strut assembly 14 (hereinafter the strut assembly 14) includes, among other elements, a strut member 18 with a shock absorber 20, a flexible boot 22, a coil spring 24, a bearing assembly 26, a mounting bracket 28 and a noise isolating member 30.

Figure 4:
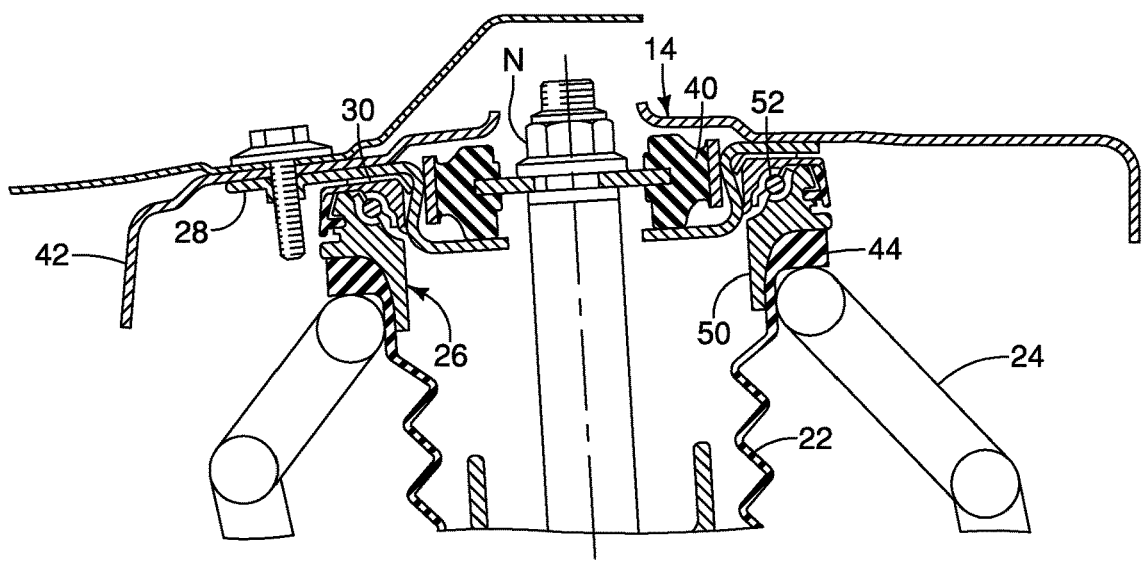
FIG. 4 is a cross-sectional view of an upper portion of the vehicle strut assembly depicted in FIG. 3 showing an upper portion of a strut member, a shock absorber, a flexible boot, a coil spring, a bearing assembly, a mounting bracket and a noise isolating member in accordance with the first embodiment.

The strut member 18 is a cylindrically shaped structure with an at least partially hollow interior (not shown) that receives the shock absorber 20. The strut member 18 further includes lower flanges that are attached to portions of the front suspension assembly 12 in a conventional manner. The strut member 18 further includes a lower spring seat 32 that supports a lower end of the coil spring 24 in a conventional manner. The shock absorber 20 has a housing 34 and a piston shaft 36 that extends down into the housing 34 in a conventional manner. The piston shaft 36 of the shock absorber 20 has an upper end 38 that defines an attachment portion of the piston shaft 36. A centering member 40 (also a flexible, vibration absorbing member) is fitted to the upper end 38 during the assembly of the strut assembly 14 when the strut assembly 14 is fitted to a strut tower 42 of the vehicle 10. The upper end 38 has a threaded portion that is used to secure the upper end 38 in position via a nut N, as shown in FIGS. 3 and 4. Since the strut member 18, the shock absorber 20, the coil spring 24 and the various elements of the front suspension assembly 12 are conventional structures, further description is omitted for the sake of brevity.

The flexible boot 22 is a conventional element of the strut assembly 14 and includes an upper flange portion 44 and a lower end 46 that is configured to attach to an upper end of the strut member 18, or, a portion of the shock absorber 20 exposed adjacent to the lower spring seat 32 of the strut member 18.

As shown in FIG. 4, an upper end of the coil spring 24 contacts a lower surface of the upper lip or upper flange portion 44 of the flexible boot 22. The upper surface of the upper flange portion 44 of the flexible boot 22 contacts surfaces of the bearing assembly 26. The bearing assembly 26 has a lower portion 50 and an upper portion 52, as shown in FIGS. 3 and 4. With the strut assembly 14 completely assembled, the bearing assembly 26 encircles an upper end portion of the strut member 18, as shown in FIG. 4.

Figure 5:
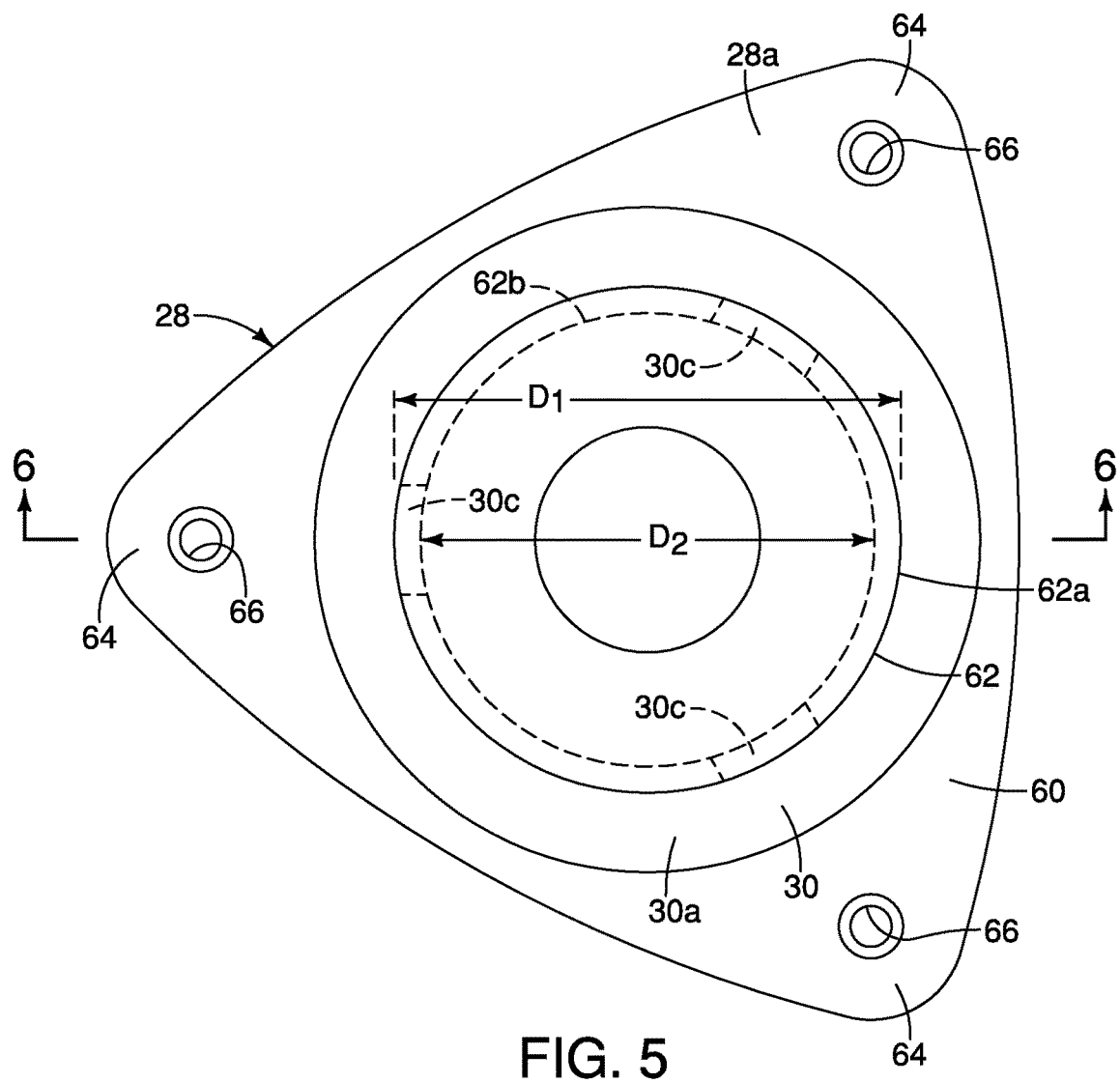
FIG. 5 is a bottom view of the mounting bracket and the noise isolating member removed from the vehicle strut assembly with the noise isolating member overlaying a lower surface of a portion of the mounting bracket in according to the first embodiment.
Figure 6:
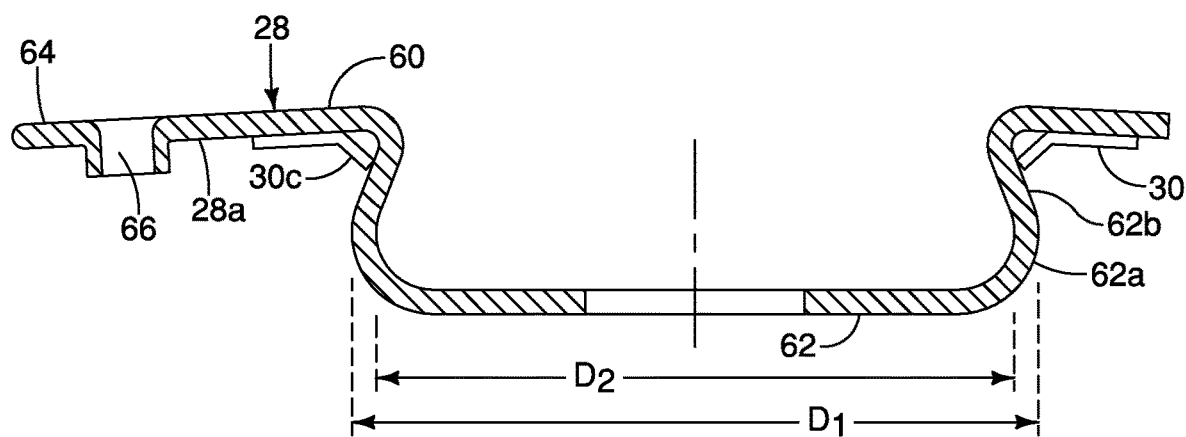
FIG. 6 is a cross-section of the mounting bracket and the noise isolating member taken along the line 6-6 in FIG. 5 in accordance with the first embodiment.
Figure 7:
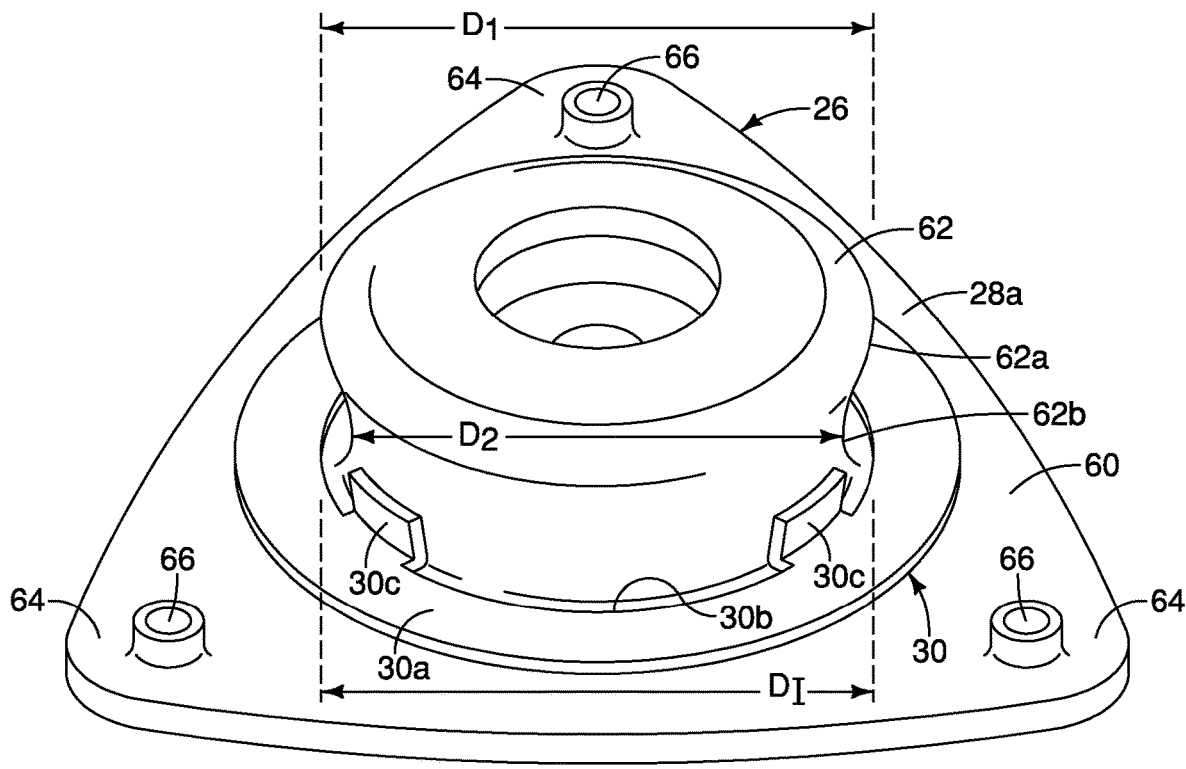
FIG. 7 is a perspective view of the mounting bracket and the noise isolating member showing the noise isolating member overlaying the portion of the lower surface of the mounting bracket and showing a cup-shaped portion of the mounting bracket with radially inwardly protruding tabs of the noise isolating member contacting an upper portion of the cup-shaped portion of the mounting bracket in accordance with the first embodiment.

The mounting bracket 28 is depicted removed from the strut assembly 12 in FIGS. 5-7. The mounting bracket 28 is configured to receive the bearing assembly 26 with mounting bracket 28 encircling the upper end 38 of the strut member 18 and further configured to attach to a portion of a vehicle body assembly 14 of the vehicle 10. The mounting bracket 28 includes a main plate portion 60 and a cup shaped portion 62. As shown in FIGS. 5-7, the main plate portion 60 that has an overall triangular shape with curved or rounded edges. The main plate portion 60 defines three wings or flange portions 64, each having an opening 66 dimensioned to receive fasteners for attachment to the strut tower 42 of the vehicle, as shown in FIG. 4.

The cup shaped portion 62 has an overall cylindrical shape. However, the cylindrical shape does not have straight walls. Rather, when viewed from the side as shown in FIGS. 6 and 7, the cup shaped portion 62 has a sinusoidal or serpentine-like shape. Specifically, a lower portion 62a of the cup shaped portion 62 has a first outer diameter $D_1$ that gradually curves radially inward to an upper portion 62b of the cup shaped portion 62 that has a second outer diameter $D_2$ that is smaller than the first outer diameter $D_1$.

Figure 8:
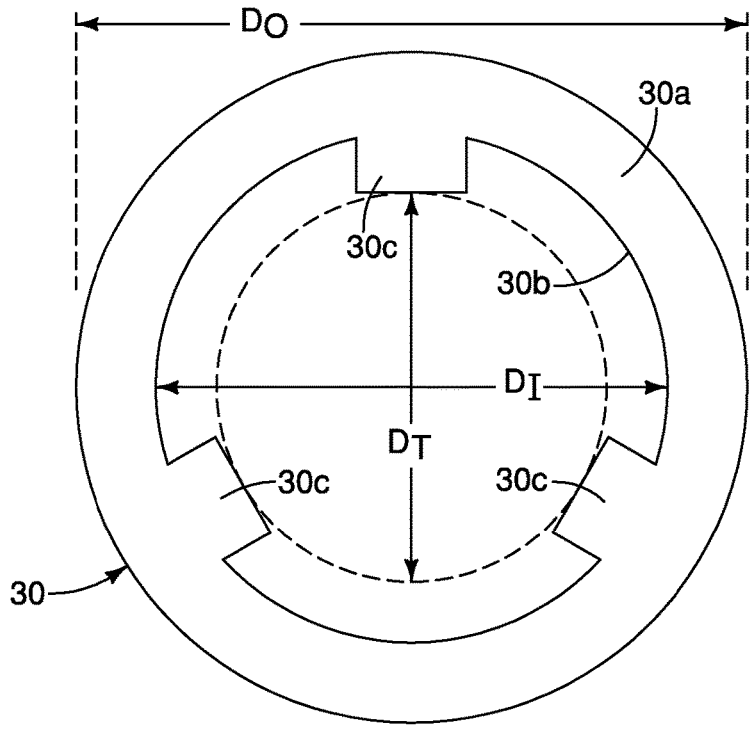
FIG. 8 is a bottom view of the noise isolating member removed from the mounting bracket showing the radially inwardly protruding tabs in accordance with the first embodiment.

The noise isolating member 30 is an annular shaped member that has a main section 30a with a central opening 30b and a plurality of inwardly protruding projections 30c (hereinbelow referred to as tabs 30c) that extend into the central opening 30b. The central opening 30b of the noise isolating member 30 defines an inner diameter $D_I$. The noise isolating member 30 further defines and an outer diameter $D_O$. The inwardly protruding tabs 30c extend radially inward such that their respective radially inner edges coincide with a tab inner diameter $D_T$, as shown in FIG. 8.

It should be noted that FIG. 7 shows the mounting bracket 28 and the noise isolating member 30 up-side down, for greater clarity. As shown in FIG. 7, the inner diameter $D_I$ of the central opening 30b is slightly larger than the first outer diameter $D_1$ of the lower portion 62a of the cup shaped portion 62 of the mounting bracket 28. More specifically, the inner diameter $D_I$ is between 0.5 mm and 5.0 mm larger than the first outer diameter $D_1$ of the lower portion 62a of the cup shaped portion 62e. Consequently, the noise isolating member 30 can fit around the lower portion 62a of the lower portion 62a of the cup shaped portion 62. However, the tab inner diameter $D_T$ is smaller than both the first outer diameter $D_1$ and the second outer diameter $D_2$ of the upper portion 62b. Hence, during installation of the noise isolating member 30 to the cup-shaped portion 62 of the mounting bracket 28, the tabs 30c flex in order to allow the noise isolating member 30 to fit around the lower portion 62a and around the upper portion 62b of the cup shaped portion 62. Thereafter, the tabs 30c remain in a partially flexed state contacting the upper portion 62b of the cup shaped portion 62 of the mounting bracket 28, as shown in FIGS. 4-7.

Inclusion of the noise isolating member 30 in an upper region of the vehicle strut assembly 14, for instance, between the bearing assembly 26 and the mounting bracket 28, effectively reduces and/or completely eliminates certain undesirable noises generated by a vehicle strut assembly 14 during operation of the vehicle 10 and transmitted to the vehicle body structure of the vehicle 10 via the strut tower 42.

In the first embodiment, the noise isolating member 30 is installed to an upper surface 26a of a bearing assembly 26 and a lower surface 28a of the mounting bracket 28. However, in the various embodiments described below, the various noise isolating members can be installed in slightly different locations and orientations. In each of the embodiments described below, all embodiments of the noise isolating member eliminate the undesirable noises from the strut assembly 14 from propagating to the strut tower 42 and the vehicle body structure of the vehicle 10.

The noise isolating member 30 (and in each of the embodiments described below) preferably has a thickness of any value between 0.25 mm and 3.0 mm. In the depicted embodiments, each of the described the noise isolating members is, for example, 2.75 mm thick.

The noise isolating member 30 can be made of any of a variety of materials that reduces or eliminate noise propagating from elements on opposite sides of the noise isolating member 30. In the depicted embodiment, the noise isolating member 30 is made of a paper material with a greater than 50 percent concentration of cellulose. Hence, the noise isolating member 30 can be made of a cellulose material, or cellulose based material, such as thick paper where the cellulose material is the primary material. Alternatively, the cellulose material can be mixed with or treated with non-metallic materials. The cellulose material can include stiffening agents, such as sizing materials, to assist in the retention of the depicted shape. The noise isolating member 30 can also be coated or impregnated with a lubricating material, such as paraffin, grease, graphite and heavy weight oil.

The paper-like feel and flexibility of the noise isolating member 30 can also be achieved by using non-cellulose materials such as fiber-glass material, polypropylene, polyester, nylon and/or cotton. If one of fiber-glass material, polypropylene, polyester, nylon and/or cotton is a base material for the noise isolating member 30, the base material can further be coated or impregnated with any of a variety of materials that enhance the noise isolating characteristics of the noise isolating member 30, such as rubber, rubber-like materials and/or polymer or elastic resin based materials. The noise isolating member 30 can also be made of a material known as OS 500-W manufactured by NOK Corporation, Tokyo, Japan. OS 500-W is a material that is manufactured, for example, by impregnating gelatin, preservatives and fabric softener into a base paper made from kraft pulp.

Further, the noise isolating member 30 can also be made from a metallic annular ring that is coated with a rubber or rubber-like material, an elastic and/or flexible polymer/resin material, or a cellulose material. The noise isolating member 30 can also be made from rubber or a rubber-like material such as a flexible resin polymer or other noise and vibration absorbing material. Further, the noise isolating members described herein can include a variety of differing materials that ensure water resistance.

The noise isolating member 30 can be used in the strut assembly 14 in a non-lubricated condition or can optionally coated or impregnated with a lubricating material, such as paraffin, grease, graphite and heavy weight oil.

Second Embodiment

Figure 9:
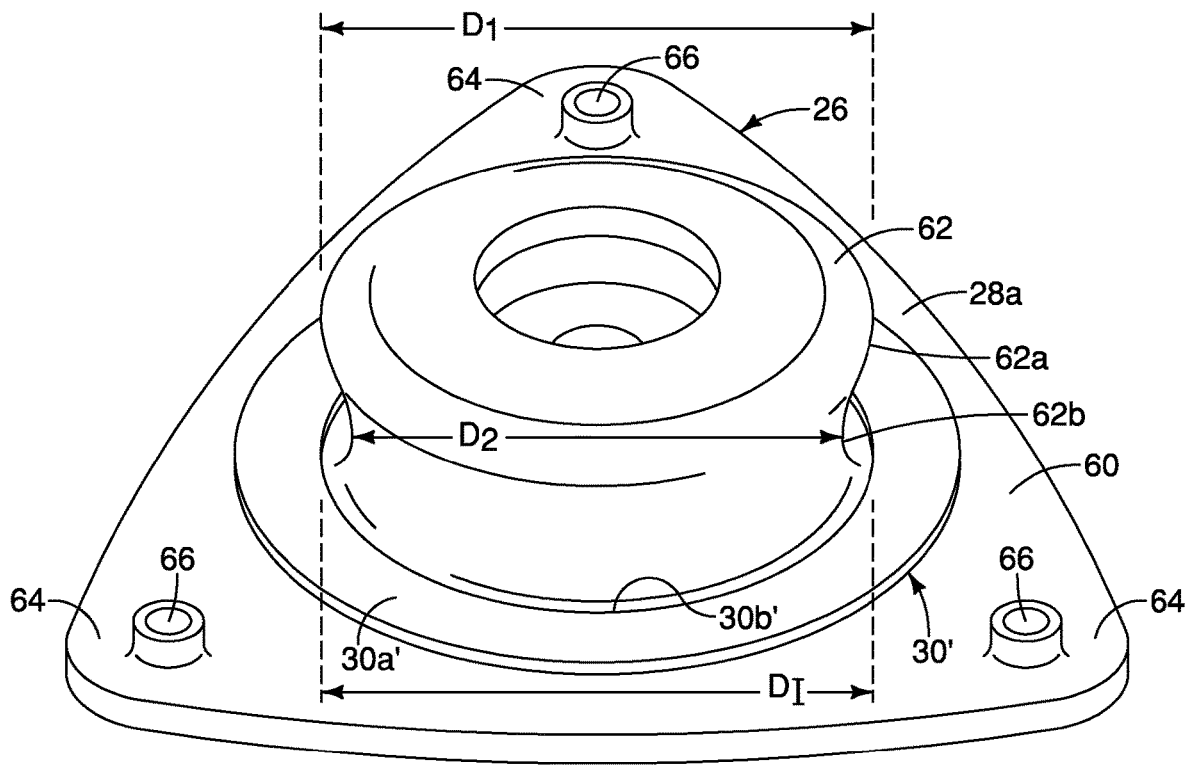
FIG. 9 is a perspective view of the mounting bracket and a noise isolating member showing the noise isolating member overlaying the portion of the lower surface of the mounting bracket in accordance with a second embodiment.
Figure 10:
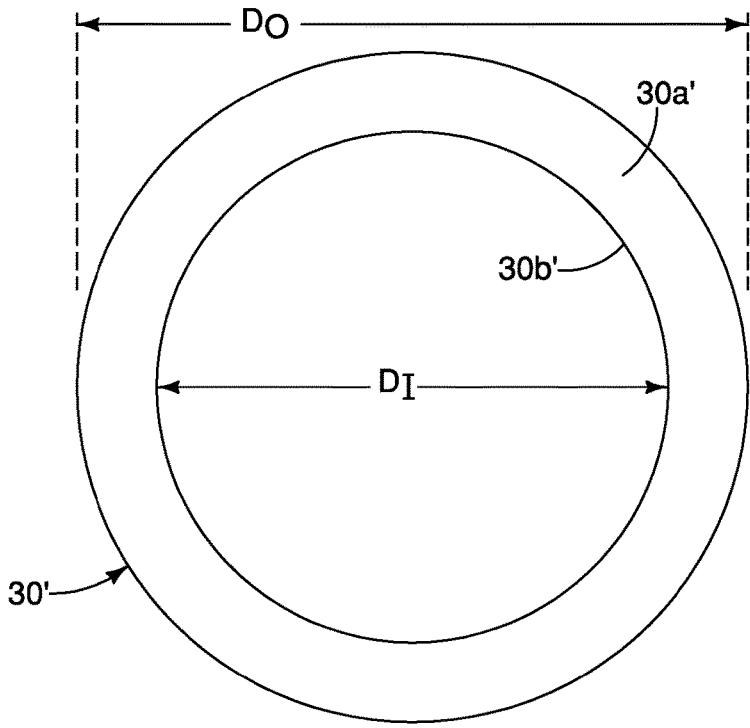
FIG. 10 is a bottom view of the noise isolating member removed from the mounting bracket in accordance with the second embodiment.

Referring now to FIGS. 9 and 10, a noise isolating member 30' with the mounting bracket 28 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the noise isolating member 30' is basically the same as the noise isolating member 30 of the first embodiment, except that there are no inwardly protruding tabs, such as the tabs 30c of the first embodiment. Instead, the noise isolating member 30' has an annular shape with an inner diameter $D_I$ and an outer diameter $D_O$ that are identical to the inner and outer diameters of the first embodiment.

The noise isolating member 30' is coated or impregnated with a lubricating material, such as paraffin, grease, graphite and heavy weight oil, which provides the noise isolating member 30' with sufficient adhesion to remain on the lower surface 28a of the main plate portion 60 of the mounting bracket 28 during assembly of the vehicle strut assembly 14. The noise isolating member 30' provides the noise reducing and noise eliminating properties as the noise isolating member 30 of the first embodiment.

Third Embodiment

Figure 11:
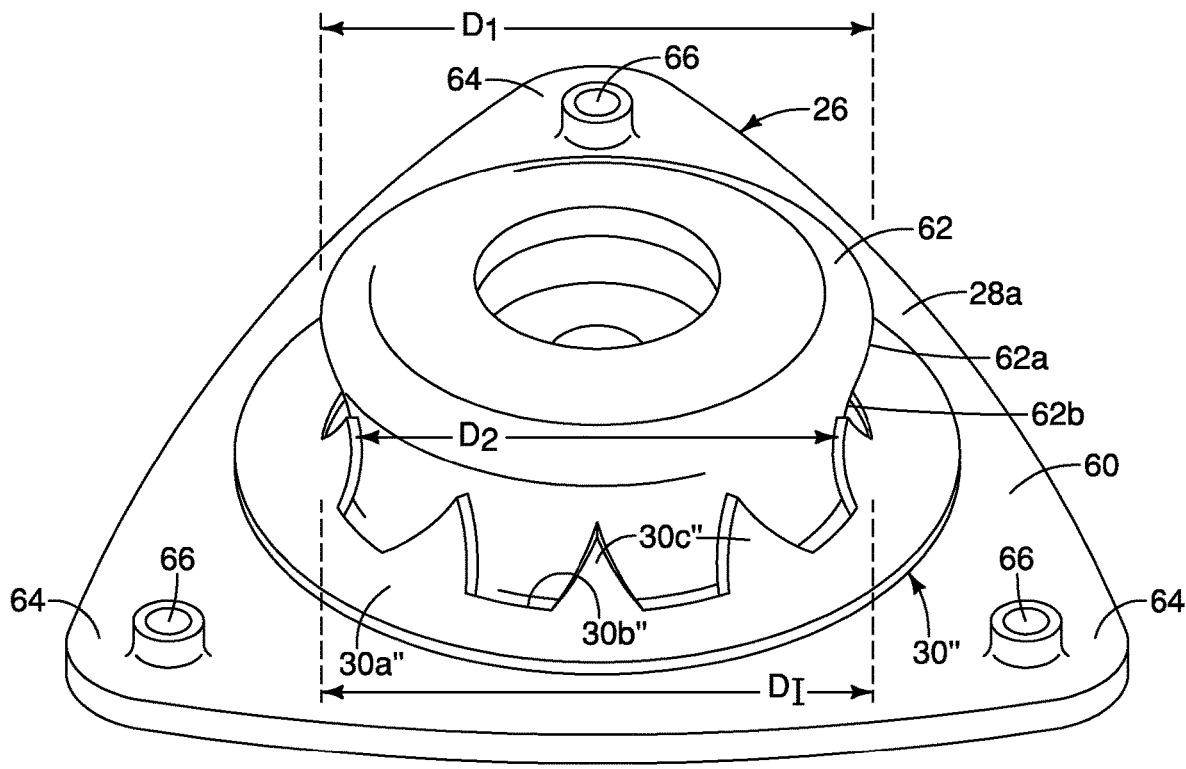
FIG. 11 is a perspective view of the mounting bracket and a noise isolating member showing the noise isolating member overlaying the portion of the lower surface of the mounting bracket and showing the cup-shaped portion of the mounting bracket with a plurality of radially inwardly protruding tabs of the noise isolating member contacting an upper portion of the cup-shaped portion of the mounting bracket, each of the plurality of radially inwardly protruding tabs having a triangular shape in accordance with a third embodiment.
Figure 12:
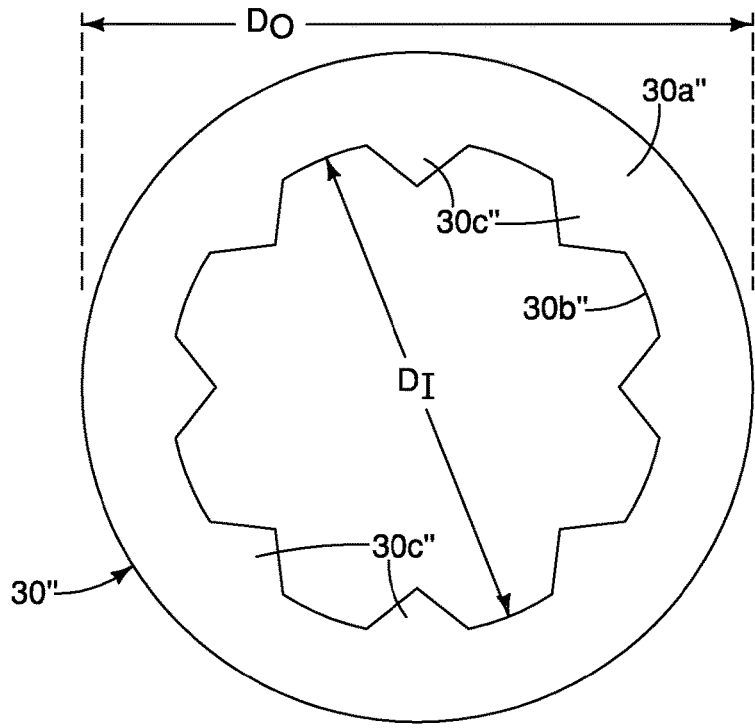
FIG. 12 is a bottom view of the noise isolating member removed from the mounting bracket showing the plurality of radially inwardly protruding tabs in accordance with the third embodiment.

Referring now to FIGS. 11 and 12, a noise isolating member 30" with the mounting bracket 28 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment, the noise isolating member 30" is basically the same as the noise isolating member 30 of the first embodiment and includes a main section 30a", a central opening 30b" and inwardly protruding tabs 30c". The inwardly protruding tabs 30c of the first embodiment been replaced with a plurality of inwardly protruding tabs 30c''. Each of the plurality of inwardly protruding tabs 30c'' has an overall triangular shape.

The noise isolating member 30'' has an annular shape defining the inner diameter $D_I$ and an outer diameter $D_O$ that are identical to the inner and outer diameters of the first embodiment.

The noise isolating member 30'' can optionally be coated or impregnated with a lubricating material, such as paraffin, grease, graphite and heavy weight oil, which provides the noise isolating member 30''. The noise isolating member 30'' provides the noise reducing and noise eliminating properties as the noise isolating member 30 of the first embodiment.

Fourth Embodiment

Figure 13:
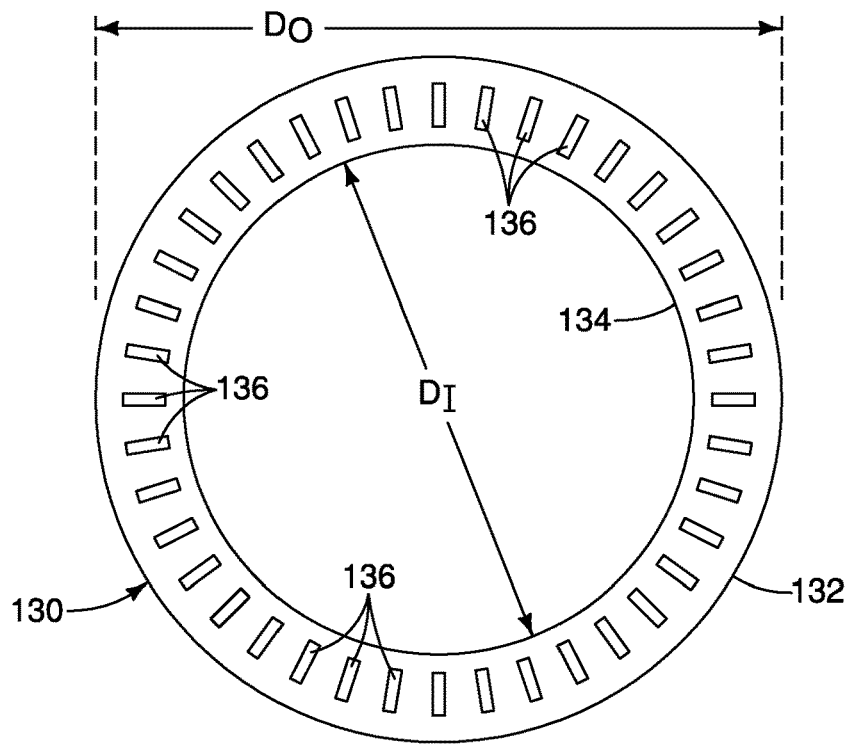
FIG. 13 is a bottom view of a noise isolating member removed from the mounting bracket showing a plurality of rectangular openings provide in the noise isolating member overlaying in accordance with a fourth embodiment.

Referring now to FIG. 13, a noise isolating member 130 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the noise isolating member 130 has an annular shape identical to the noise isolating member 30' of the second embodiment. More specifically, a radial outer edge 132 of the noise isolating member 130 defines the outer diameter $D_O$ and the radial inner edge 134 of the noise isolating member 130 defines the inner diameter $D_I$. However, the noise isolating member 130 of the fourth embodiment has been modified to include a plurality of rectangular openings 136 that are spaced apart from one another in an annular direction. Further, each of the plurality of rectangular openings 134 is spaced apart from the radial inner edge 134 and the radial outer edge 132 of the noise isolating member 130.

Fifth Embodiment

Figure 14:
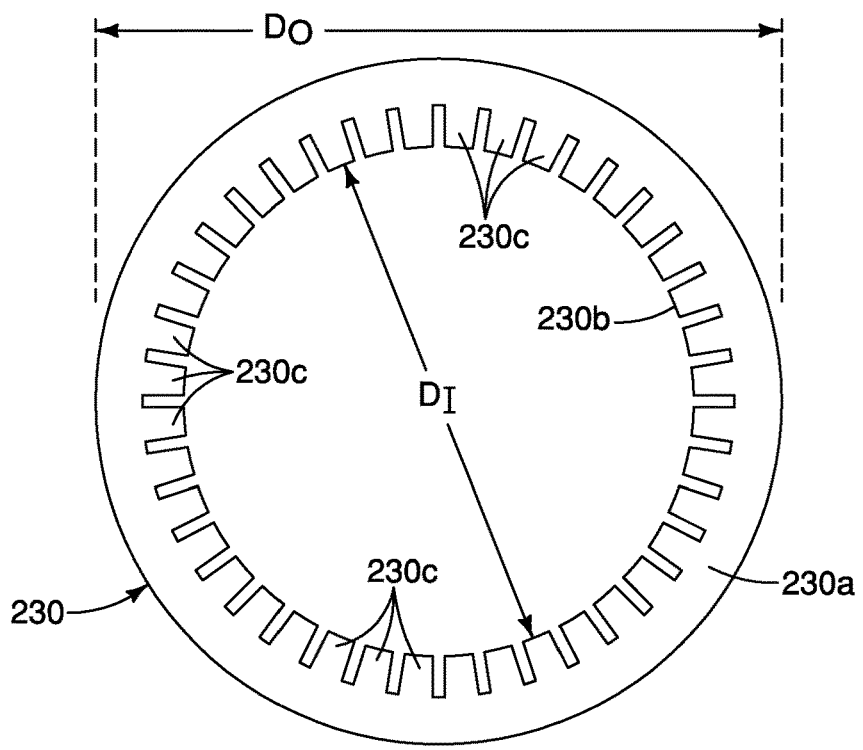
FIG. 14 is a bottom view of the noise isolating member removed from the mounting bracket showing a plurality of radially inwardly protruding tabs in accordance with a fifth embodiment.

Referring now to FIG. 14, a noise isolating member 230 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the noise isolating member 230 has an annular shape with a main section 230a, a central opening 230b having an inner edge that includes a plurality of radially inwardly extending projections 230c that are shaped and dimensioned to contact the cup shaped portion of the lower surface of the mounting bracket (not shown in FIG. 13. Each of the plurality of radially inwardly extending projections 230c of the noise isolating member has an overall rectangular shape. There can be between 20 and 50 of the plurality of radially inwardly extending projections 230c. In the fifth embodiment, there are 40 of the plurality of radially inwardly extending projections 230c.

Sixth Embodiment

Figure 15:
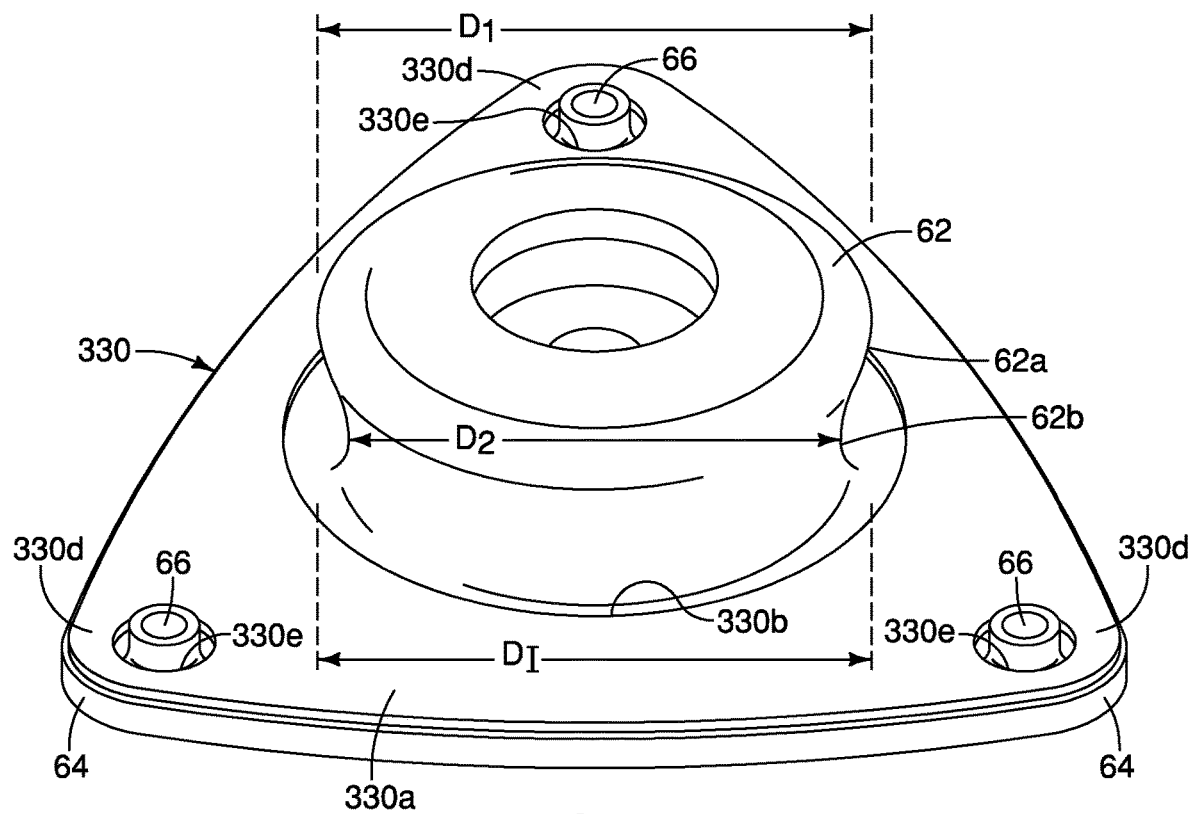
FIG. 15 is a perspective view of the mounting bracket and a noise isolating member showing the noise isolating member overlaying the portion of the lower surface of the mounting bracket, the noise isolating member having approximately the same shape as a main plat portion of the mounting bracket in accordance with a sixth embodiment.
Figure 16:
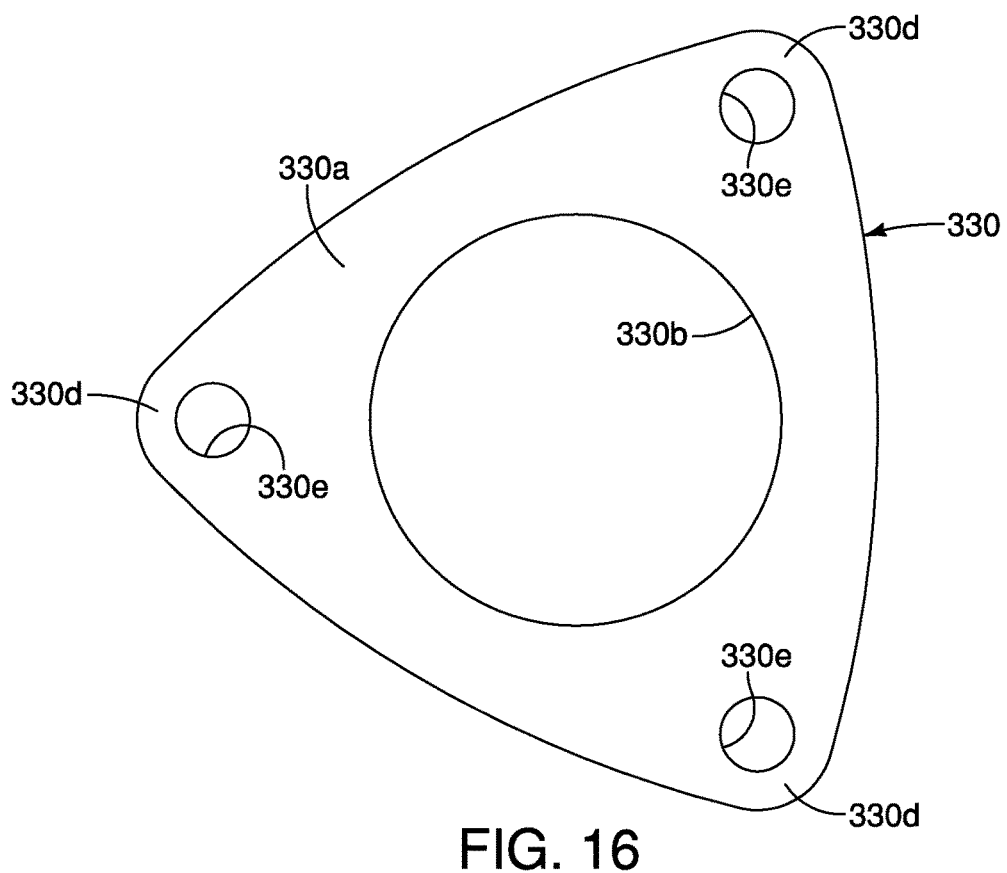
FIG. 16 is a bottom view of the noise isolating member removed from the mounting bracket in accordance with the sixth embodiment.

Referring now to FIGS. 15 and 16, a noise isolating member 330 and the mounting bracket 28 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the noise isolating member 330 has a rounded triangular-like shape with a main section 330a, a central opening 330b, an outer edge 330c and a plurality of radially outward projecting area 330d that define the rounded triangular-like shape. Hence, in the sixth embodiment, there are three radially outward projecting area 330d. The noise isolating member 330 has generally the same shape (but slightly smaller) as the main plate portion 60 of the mounting bracket 29. More specifically, the plurality of radially outward projecting areas 330d are approximately the same shape as the three wings or flange portions 64 of the main plate portion 60 of the mounting bracket 28, and, the plurality of radially outward projecting areas 330d overlay the three wings or flange portions 64 of the main plate portion 60 of the mounting bracket 28. Further, each the plurality of radially outward projecting areas 330d includes an opening 330e that aligns with corresponding openings 66 in the mounting bracket 28.

Seventh Embodiment

Figure 17:
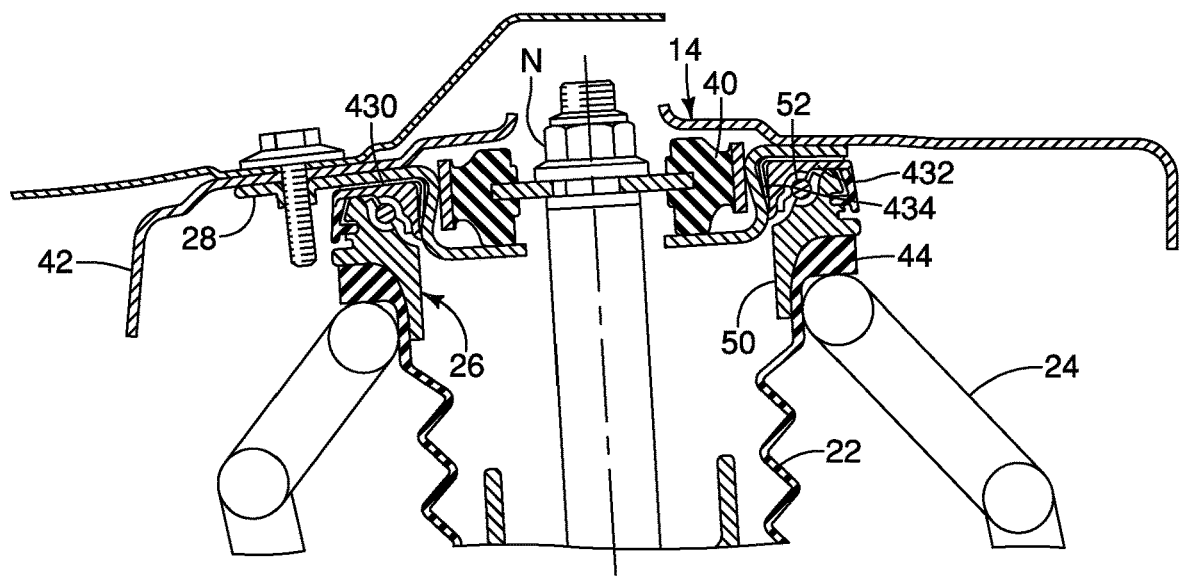
FIG. 17 is a cross-sectional view of an upper portion of the vehicle strut assembly showing a noise isolating member having an annular portion and a cylindrically shaped portion with the annular portion overlaying a lower surface of the mounting bracket and the cylindrical portion overlaying a portion of the cup-shaped portion of the mounting bracket in accordance with a seventh embodiment.
Figure 18:
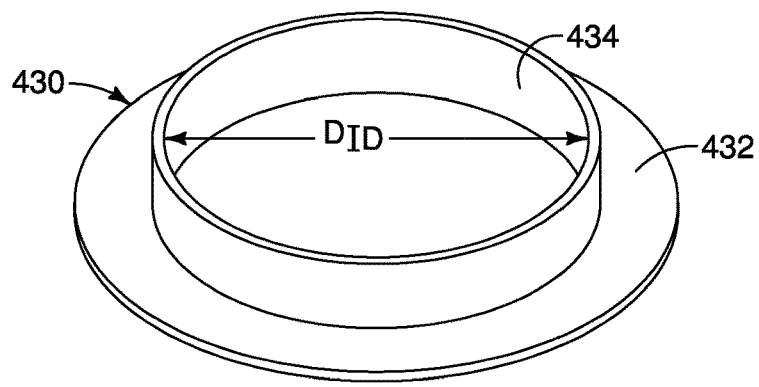
FIG. 18 is a perspective view of the noise isolating member removed from the mounting bracket showing the annular portion and the cylindrically shaped portion in accordance with the seventh embodiment.
Figure 19:
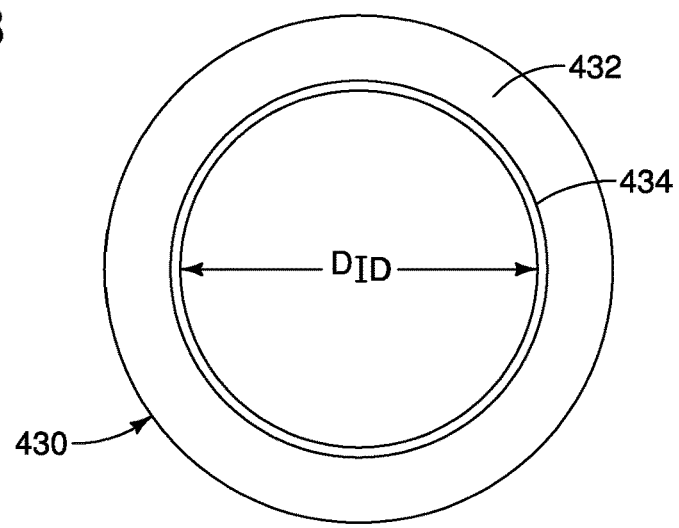
FIG. 19 is a bottom view of the noise isolating member removed from the mounting bracket showing the annular portion and the cylindrically shaped portion in accordance with the seventh embodiment.

Referring now to FIGS. 17-19, a noise isolating member 430 and the upper portions of the vehicle strut assembly 14 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, the vehicle strut assembly 14 is as described with respect to the first embodiment, except that the noise isolating member 30 has been replaced with the noise isolating member 430. The noise isolating member 430 includes a first portion 432 and a second portion 434. The first portion 432 has an overall annular shape with a central opening 432a. The second portion 434 has an overall cylindrical shape with an inner diameter $D_{ID}$ equal to the inner diameter of the first portion 432. The second portion 434 extends from the first portion 432 such that the first portion 432 and the second portion 434 are coaxial.

As shown in FIG. 17, with the noise isolating member 430 installed to the vehicle strut assembly 14, the first portion 432 is located between the lower surface 28a of the mounting bracket 28 and the upper portion 52 of the bearing assembly 26. Further, the second portion 434 is located between the cup-shaped portion 62 of the mounting bracket 28 and an inner radial surface of the upper portion 52 of the bearing assembly 26.

Eighth Embodiment

Figure 20:
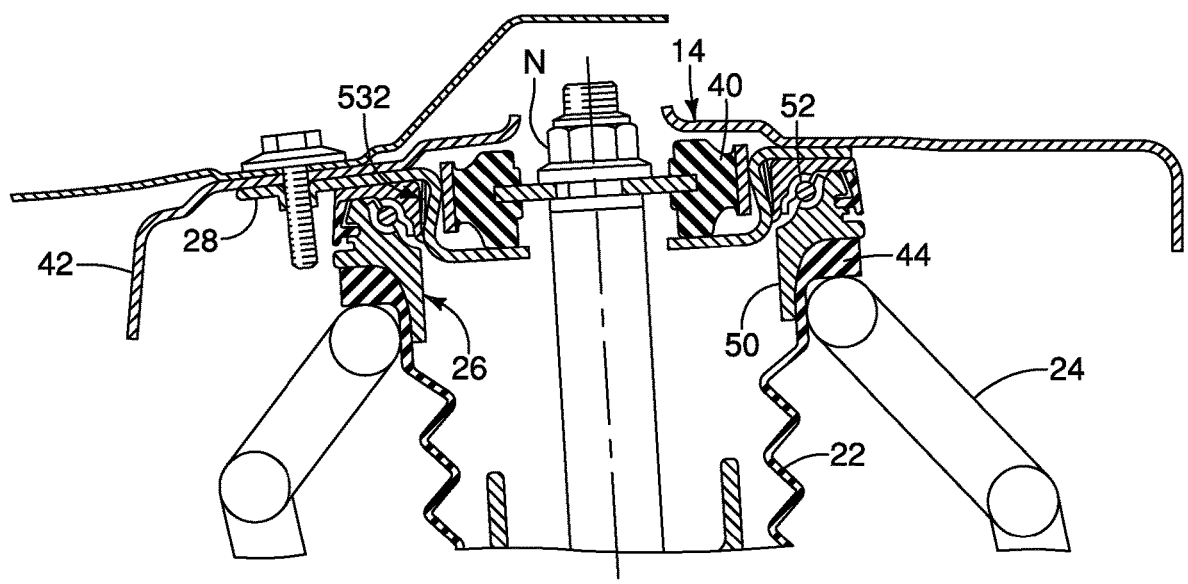
FIG. 20 is a cross-sectional view of the upper portion of the vehicle strut assembly showing a noise isolating member having only a cylindrically shaped portion to the cup-shaped portion of the mounting bracket in accordance with an eighth embodiment.
Figure 21:
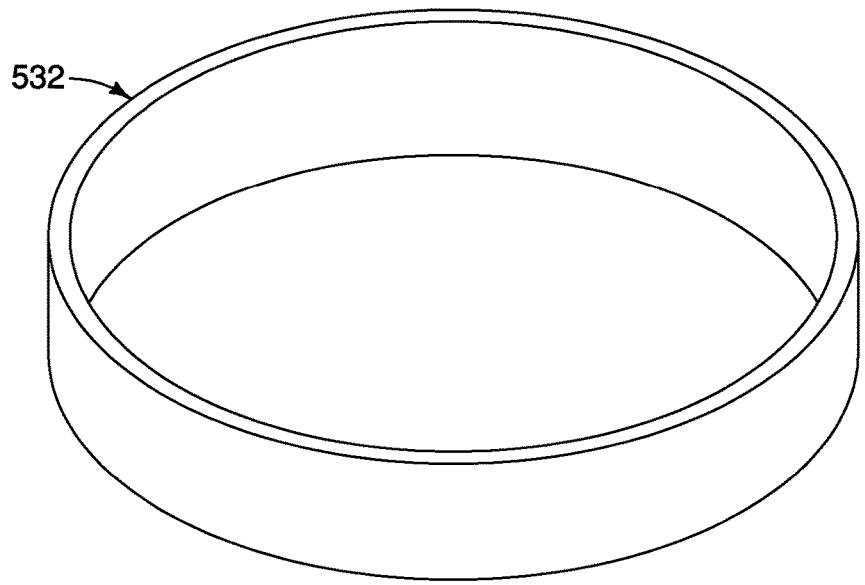
FIG. 21 is a perspective view of the noise isolating member removed from the mounting bracket showing the cylindrically shape thereof in accordance with the eighth embodiment.

Referring now to FIGS. 20-21, a noise isolating member 532 and the upper portions of the vehicle strut assembly 14 in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

In the eighth embodiment, the vehicle strut assembly 14 is as described with respect to the first embodiment, except that the noise isolating member 30 has been replaced with the noise isolating member 532. The noise isolating member 532 has an overall cylindrical shape.

As shown in FIG. 20, with the noise isolating member 532 installed to the vehicle strut assembly 14, the noise isolating member 532 is located between the cup-shaped portion 62 of the mounting bracket 28 and an inner radial surface of the upper portion 52 (a housing) of the bearing assembly 26.

Ninth Embodiment

Figure 22:
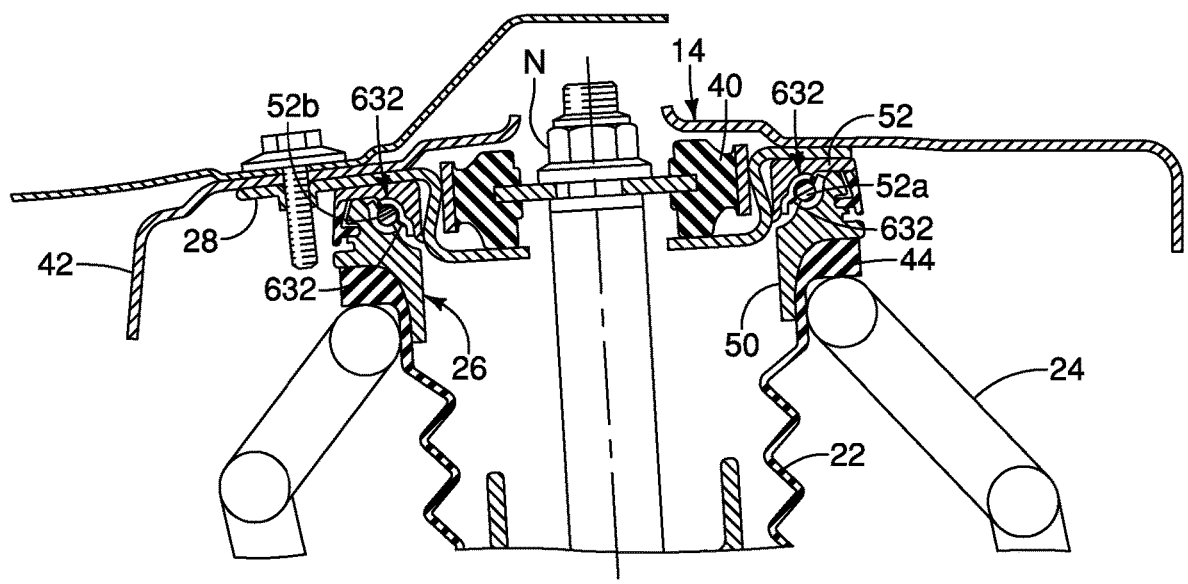
FIG. 22 is a cross-sectional view of the upper portion of the vehicle strut assembly showing a noise isolating member installed between portions of the bearing assembly in accordance with a ninth embodiment.
Figure 23:
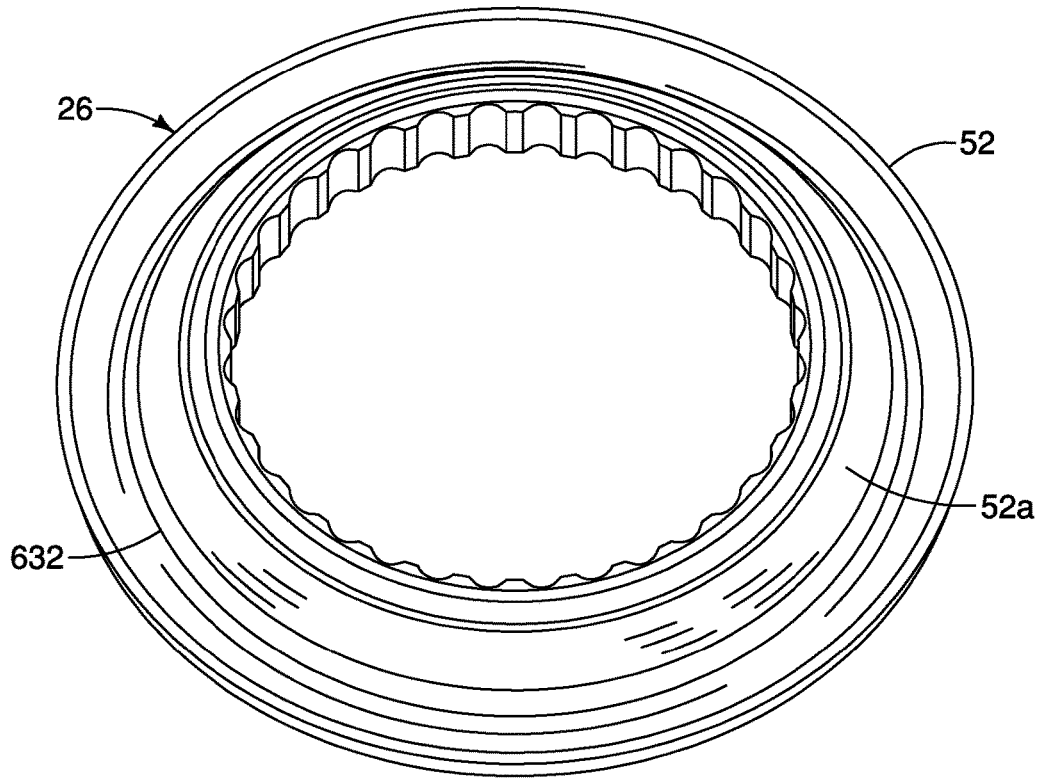
FIG. 23 is a perspective view of an upper portion of the bearing assembly with a noise isolating member, the noise isolating member being installed along a lower surface of the upper portion of the bearing assembly and held in place by a bearing/retaining ring in accordance with the ninth embodiment.
Figure 24:
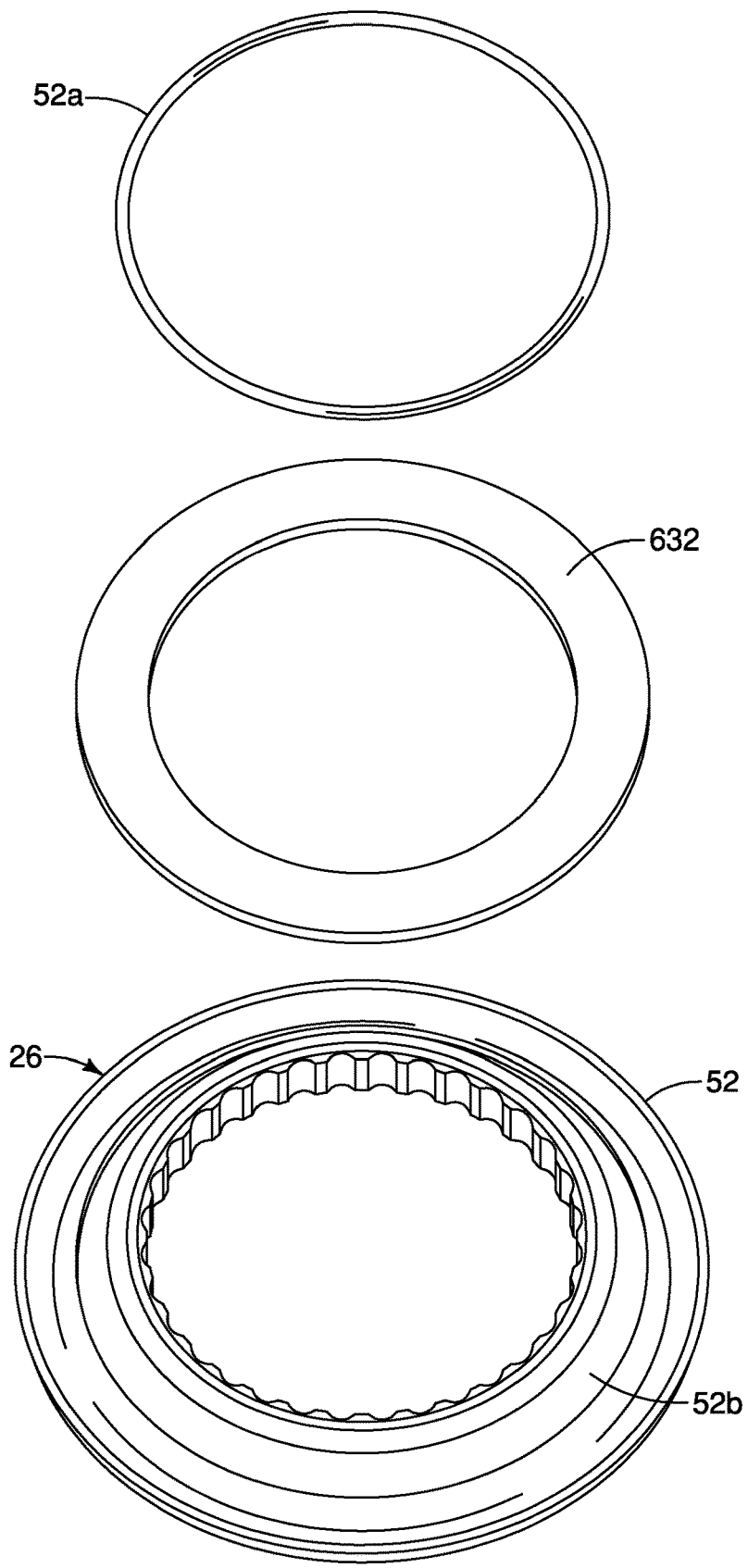
FIG. 24 is an exploded perspective view of a lower surface of the upper portion of the bearing assembly showing the noise isolating member and the bearing/retaining ring in accordance with the ninth embodiment.

Referring now to FIGS. 22-24, a noise isolating member 632 and the upper portions of the vehicle strut assembly 14 in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

In the ninth embodiment, the vehicle strut assembly 14 is as described with respect to the first embodiment, except that the noise isolating member 30 has eliminated and the noise isolating member 632 within the bearing assembly 26. The noise isolating member 632 has an overall annular shape but is pressed into an annular recess of the upper portion 52 of the bearing assembly 52 that is shaped and dimensioned to receive a bearing/retainer 52a, as shown in FIG. 23. As shown in FIG. 24, the noise isolating member 632 is initially flat, placed over the annular recess of the upper portion 52, then pressed into place by insertion of the bearing/retainer 52a. Consequently, the noise isolating member 632 is deformed to conform to the shape of the bearing/retainer 52a and the annular recess of the upper portion 52 of the bearing assembly 52.

All nine of the above described embodiments of the noise isolating member and its installation into the upper portion of the vehicle strut assembly 14 provide a noise eliminating or noise reducing benefit to the front suspension assembly 12 of the vehicle 10. Consequently, such noises are not heard by passengers within the vehicle 10.

The various structures and components of the vehicle 10, other than the vehicle strut assembly 14, are conventional structures and components that are well known in the art. Since such conventional structures and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle strut assembly. Accordingly, these terms, as utilized to describe the present invention should be interpreted relative to a vehicle equipped with the vehicle strut assembly.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle strut assembly, comprising a strut member; a bearing assembly encircling an upper end portion of the strut member; a mounting bracket configured to receive the bearing assembly with mounting bracket encircling the upper end portion of the strut member and further configured to attach to a portion of a vehicle body assembly of a vehicle; and a noise isolating member installed below the mounting bracket and along a surface of the bearing assembly reducing noises transmitted from the vehicle strut assembly to the portion of the vehicle body assembly, the noise isolating member including a first portion and a second portion, the first portion having an overall annular shape with a central opening, the second portion having an overall cylindrical shape having an inner diameter equal to an inner diameter of the first portion, the second portion extending from the first portion such that the first portion and the second portion are coaxial.

2. The vehicle strut assembly according to claim 1, wherein
the noise isolating member is installed to an upper surface of a bearing assembly and a lower surface of the mounting bracket.

3. The vehicle strut assembly according to claim 2, wherein
the noise isolating member has an annular shape with a predetermined inner diameter corresponding to an inner diameter of a portion of the lower surface of the mounting bracket.

4. The vehicle strut assembly according to claim 2, wherein
the noise isolating member an annular shape with a central opening having an inner edge that includes a plurality of radially inwardly extending projections that contact a cup-shaped portion of the mounting bracket.

5. The vehicle strut assembly according to claim 2, wherein
each of the plurality of radially inwardly extending projections of the noise isolating member has an overall rectangular shape.

6. The vehicle strut assembly according to claim 4, wherein
each of the plurality of radially inwardly extending projections of the noise isolating member has an overall triangular shape.

7. The vehicle strut assembly according to claim 1, wherein
the noise isolating member has an annular shape with a predetermined inner diameter corresponding to an inner diameter of a central portion of the lower surface of the mounting bracket.

8. The vehicle strut assembly according to claim 7, wherein
the noise isolating member defines a plurality of rectangular openings spaced apart from one another in an annular direction, each of the plurality of openings further being spaced apart from an inner radial edge and an outer radial edge of the noise isolating member.

9. The vehicle strut assembly according to claim 1, wherein
the noise isolating member has an annular shape with a central opening with an inner edge that includes a plurality of radially inwardly extending projections that contact a protruding central portion of the lower surface of the mounting bracket.

10. The vehicle strut assembly according to claim 9, wherein
each of the plurality of radially inwardly extending projections of the noise isolating member has an overall rectangular shape.

11. The vehicle strut assembly according to claim 9, wherein
each of the plurality of radially inwardly extending projections of the noise isolating member has an overall triangular shape.

12. The vehicle strut assembly according to claim 1, wherein
the noise isolating member a circular central opening and an outer edge, the outer edge having a plurality of projecting areas such that the overall shape of the outer edge corresponds to an overall shape of an outer edge of the mounting bracket.

13. The vehicle strut assembly according to claim 12, wherein
each the plurality of projecting areas of the noise isolating member has an opening that aligns with corresponding openings in the mounting bracket.

14. The vehicle strut assembly according to claim 1, wherein
the noise isolating member has an overall cylindrical shape having an inner diameter and is installed between an inner cylindrical surface of the bearing assembly and an outer cylindrical surface of the mounting bracket.

15. The vehicle strut assembly according to claim 1, wherein
the noise isolating member has an annular shape and is installed between a housing of the bearing assembly and an adjacent surface of a bearing race of the bearing assembly.

16. The vehicle strut assembly according to claim 15, wherein
the noise isolating member is coated with a lubricating material.

17. The vehicle strut assembly according to claim 16, wherein
the lubricating material is selected from one of the following materials consisting of: paraffin, grease, graphite and heavy weight oil.

18. The vehicle strut assembly according to claim 1, wherein
the noise isolating member is coated with a lubricating material.

19. The vehicle strut assembly according to claim 18, wherein
the lubricating material is selected from one of the following materials consisting of: paraffin, grease, graphite and heavy weight oil.

20. The vehicle strut assembly according to claim 1, wherein the noise isolating member is made of at least one of: a cellulose material, a cellulose based material and a thick paper where the cellulose material is a primary material of the thick paper.

* * * * *